June 1, 1965 R. C. HEIDNER 3,186,374
PRESSURE RELIEF MEANS FOR MARINE PROPULSION DEVICE
Filed May 14, 1962
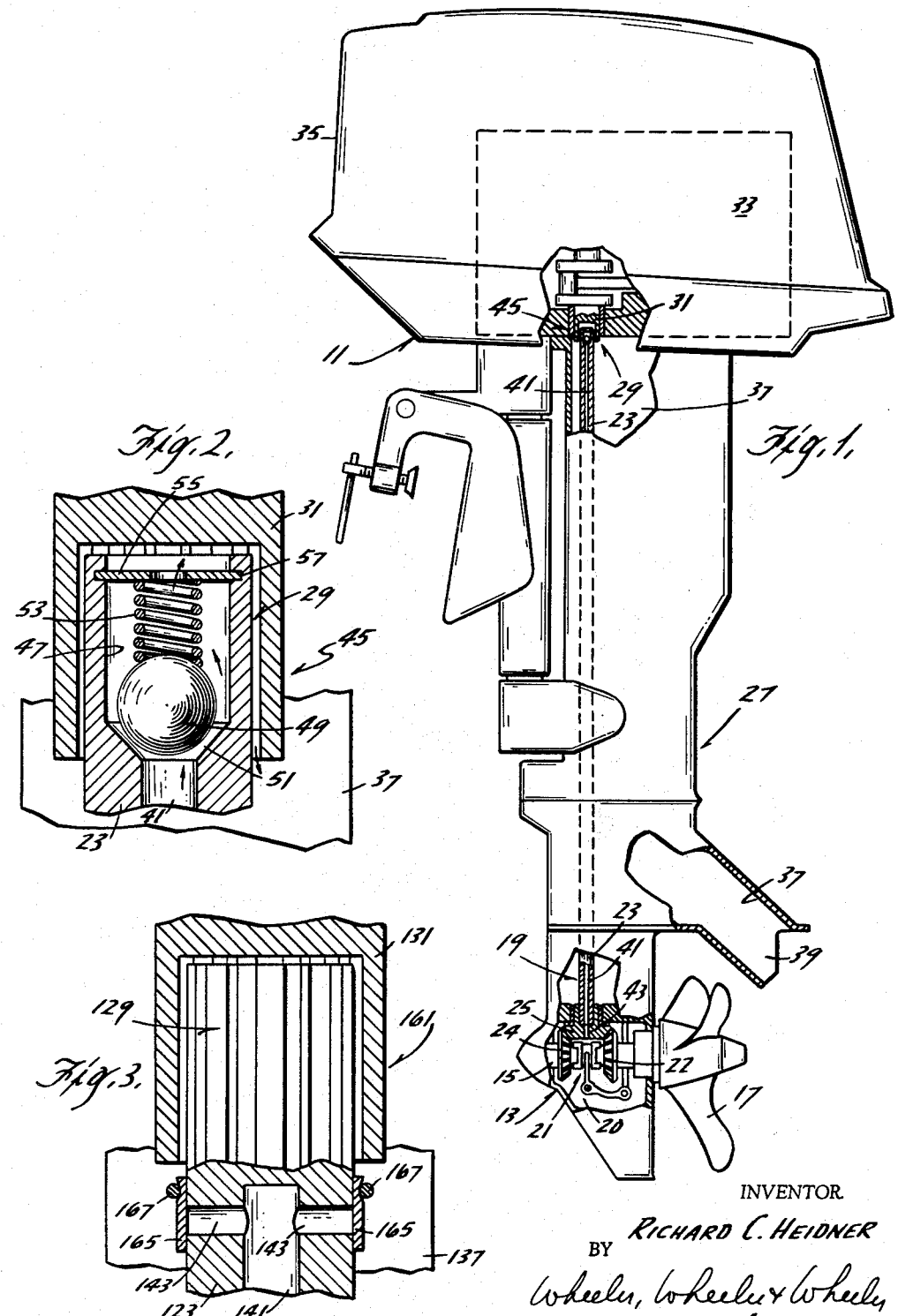
INVENTOR.
RICHARD C. HEIDNER
BY Wheeler, Wheeler & Wheeler
ATTORNEYS.

3,186,374
PRESSURE RELIEF MEANS FOR MARINE PROPULSION DEVICE

Richard C. Heidner, Libertyville, Ill., assignor to Outboard Marine Corporation, Waukegan, Ill., a corporation of Delaware
Filed May 14, 1962, Ser. No. 194,308
3 Claims. (Cl. 115—17)

The invention relates generally to marine propulsion devices, such as stern drive units and outboard motors, and to preventing loss of lubrication within the lower unit or gear housing containing the gearing connecting the driveshaft with the propeller shaft by reason of the failure or deterioration of the packings or gaskets.

It has been discovered that one of the major contributing factors tending to cause deterioration of the packings or gaskets in lower units is the generation in the lower unit of gases which, over a period of time, eventually build up to pressures of appreciable magnitude. If not relieved, such pressures tend to break down the packings, exude lubricant from the gear housing, and may also eventually permit entry of water into the gear housing.

The invention contemplates relief of such pressures in the lower unit of an outboard motor or stern drive unit, without appreciable loss of lubricant, by use of a pressure relief valve operable to dissipate excessive pressure by the discharge of such gases as may have been generated. Undesirable entry of water into the gear housing through the pressure relief valve, as for instance, if the pressure relief valve does not properly seat, is effectively prevented by locating the discharge from the pressure relief valve at the end of a conduit which communicates with the interior of the gear housing and which terminates at a point well above the normal water level during operation of the motor. Preferably, in order to prevent drainage of lubricant from the gear housing should the outboard motor be inverted, as for instance during shipment, the pressure relief valve is set or calibrated to prevent opening thereof at the static pressure normally encountered when the motor is inverted.

In the preferred construction, the conduit constitutes an axial bore in a driveshaft which extends, at least in part, through an exhaust tube and is flexibly connected within the exhaust tube to the crankshaft of an internal combustion engine. The axial bore terminates at this connection so that any minor amount of lubricant which may be discharged flows through and consequently lubricates the connection. The discharge from the relief valve is eventually aspirated through an exhaust tube into the water.

In general, the principal object of the invention is the provision of a marine propulsion device such as an outboard motor including an arrangement for relieving undesirable pressure in a gear housing. Other objects and advantages of the invention will become apparent by reference to the following description and the accompanying drawings. In the drawings:

FIGURE 1 is a side elevational view, partially broken away and in section, of an outboard motor 11 incorporating various of the features of the invention;

FIGURE 2 is an enlarged, sectional view of a relief valve arrangement incorporated in the outboard motor shown in FIGURE 1; and FIGURE 3 is a side elevational view, partially broken away and partially in section, of a modified form of relief valve arrangement.

The outboard motor 11 shown in FIGURE 1 conventionally includes a lower unit 13 which supports the propeller shaft 15 carrying propeller 17. The lower unit 13 also houses part of power transmission means 19 and additionally serves as a sealed gear case or housing 20 for a lubricant and for a reversing set 21 of gears which constitute a portion of the power transmission means 19. The gears 22 and 24 are selectively connectable to the propeller shaft 15 to drive the propeller 17 in opposite directions by suitable conventional means not a material part of the invention. Also included in power transmission means 19 is a driveshaft 23 which, at its lower ends, fixedly extends from a gear 25 in the reversing set 21 through a strut or housing 27 in unitary connection with the lower unit 13. At its upper end, the drive shaft 23 is joined through a suitable flexible connection, such as the illustrated splined construction 29, with the output shaft or crankshaft 31 of a prime mover 33. The prime mover 33 may be substantially enclosed in a cover or housing 35 which, in turn, may be in unitary connection with the strut 27 and lower unit 13. Any suitable form of conventional internal combustion engine or electric motor can be utilized as the prime mover. In the illustrated construction, an internal combustion engine is employed and the strut 27 conventionally includes an exhaust tube 37 which is connected to the exhaust manifold of the engine and is open as indicated at 39 at a point normally submerged in the water, whereby the exhaust is discharged below water level. In the embodiment shown in the drawings, the driveshaft 23 extends at least partially within the exhaust tube 37 and is connected to the crankshaft 31 at a point located within the exhaust tube.

Relief of excessive pressure generated in the gear case 20 within the lower unit 13 is afforded by providing a conduit communicating with the lower unit and including a relief valve which preferably opens at a point above the normal water level. In the specifically disclosed construction, the conduit is provided by an axial bore 41 in the driveshaft 23, which bore includes an extension 43 in the gear 25 open to the gear case 20.

Various forms of relief valve can be employed. One relief valve 45 is shown in FIGURES 1 and 2 and is located in the extreme upper end of the driveshaft 23. Specifically, the relief valve 45 includes a housing provided by an enlarged counter bore 47, a valve element in the form of a ball 49, which ball is normally seated by a spring 53 against a bevelled transition 51 between the axial bore 41 and the counterbore 47. The spring 53 is held in place by an apertured snap fastener 55 received in an internal groove 57 in the counter bore 47. Such gas and any entrained lubricant as may be discharged through the relief valve 45 pass through the open upper end of the counter bore, through the splined connection, and subsequently pass through the exhaust tube 37 for discharge, with the engine exhaust, into the water. As a result, any lubricant discharged during pressure relief is used to lubricate the splined connection 29 between the crankshaft 31 and the driveshaft 23.

Another relief valve 161 is shown in FIGURE 3. In this embodiment, an axial bore 141 in a driveshaft 123 terminates, just below a splined connection 129, in one or more cross bores 143, which bores are normally closed from communication with an exhaust tube 137 by a flexible and resilient valve member in the form of a relatively tight-seating sleeve 165 of rubber or like material. The sleeve 165 is retained in normally covering relation to the cross bore opening by a fastening ring 167 of suitable construction.

In the case of both valves 45 and 161, the valve members are biased to retain the valves closed by a force which is sufficient to resist any static head normally developed when the motors are inverted, as for instance during unintentional inversion during shipment. Thus, lubricant from the gear housings would not be discharged or lost if the motor happened to be inverted.

Location of the relief valve discharge opening adjacent to the connection of the driveshaft to the crankshaft substantially eliminates, during normal operating conditions, the possibility of water entering into the axial bore and consequently into the gear case, if for some reason the valve member does not seat perfectly after relief of any excessive pressure.

While the structure shown in the drawings is that of an outboard motor, it is understood that the principles of the invention are also equally applicable to stern drive units.

Various of the features of the invention are set forth in the following claims.

What is claimed is:

1. In a marine propulsion device, the combination of a sealed lower unit normally submerged in water during use of said propulsion device and adapted for containing lubricant, a propeller shaft rotatably mounted in said lower unit and carrying a propeller exteriorly of said lower unit, a prime mover located above said lower unit and having an output shaft, a driveshaft connected to said output shaft and extending into said lower unit, gear means for connecting said driveshaft and said propeller shaft, a conduit communicating with the interior of said lower unit through a hollow portion of said driveshaft and being open at a point above said lower unit, and pressure relieving valve means associated with said conduit for preventing flow from said lower unit at pressures below a predetermined level above the static pressure at said valve means when said propulsion device is inverted.

2. A marine propulsion device including a strut which is generally vertically disposed during normal operation, a sealed gear housing at the lower end of said strut, said gear housing being adapted to contain a quantity of lubricant and including a rotatably supported shaft carrying a propeller, power transmission means connected to said propeller shaft and extending in said strut, a conduit communicating with said sealed housing and extending from said housing in said strut, and valve means connected to said conduit and operative to vent said housing in response to the development of pressure in said housing above a predetermined valve in excess of the static pressure at said valve means when said propulsion device is inverted.

3. In a marine propulsion device, the combination of a sealed lower unit normally submerged in water during use of said propulsion device and adapted for containing lubricant, a propeller shaft rotatably mounted in said lower unit and carrying a propeller exteriorly of said lower unit, a prime mover located above said lower unit and having an output shaft, a driveshaft connected to said output shaft and extending into said lower unit, said drive shaft including an axial bore comunicating with the interior of said lower unit, said bore terminating at the connection of said output shaft with said driveshaft, whereby any flow from said bore is discharged through said connection and thereby lubricates said connection, said driveshaft also including at said one end, an enlarged counterbore communicating with said axial bore, a ball, and spring means releasably seating said ball at the junction of said counterbore and said axial bore.

References Cited by the Examiner

UNITED STATES PATENTS

| 1,305,964 | 6/19 | Dickson | 137—539 X |
| 1,745,024 | 1/30 | Malone | 60—52 |
| 1,854,518 | 4/32 | Little | 137—516.15 |
| 2,203,554 | 6/40 | Uhri et al. | |
| 2,489,478 | 11/49 | Buske | 74—606 X |
| 3,042,146 | 7/62 | Shimanckas | 123—196 X |

JULIUS E. WEST, *Primary Examiner.*